United States Patent [19]
Walley

[11] Patent Number: 6,031,870
[45] Date of Patent: *Feb. 29, 2000

[54] METHOD OF ELECTRONIC CONTROL

[75] Inventor: John Leonard Walley, Hamilton, New Zealand

[73] Assignee: Gallagher Group Limited, Hamilton, New Zealand

[*] Notice: This patent issued on a continued prosecution application filed under 37 CFR 1.53(d), and is subject to the twenty year patent term provisions of 35 U.S.C. 154(a)(2).

[21] Appl. No.: 08/860,351

[22] PCT Filed: Nov. 24, 1995

[86] PCT No.: PCT/NZ95/00123

§ 371 Date: Jun. 13, 1997

§ 102(e) Date: Jun. 13, 1997

[87] PCT Pub. No.: WO96/17440

PCT Pub. Date: Jun. 6, 1996

[30] Foreign Application Priority Data

Nov. 29, 1994 [NZ] New Zealand ............... 270018

[51] Int. Cl.⁷ .......................................... H03K 7/04
[52] U.S. Cl. ..................... 375/239; 375/256; 375/285; 256/10
[58] Field of Search .................... 375/317, 221, 375/207, 231, 239, 256, 285; 256/10; 307/106, 107, 108

[56] References Cited

U.S. PATENT DOCUMENTS

| | | |
|---|---|---|
| 3,539,729 | 11/1970 | Recklinghausen . |
| 4,859,686 | 8/1989 | McKissack .............. 307/106 |
| 5,023,930 | 6/1991 | Leslie .................... 455/11.1 |
| 5,097,510 | 3/1992 | Graupe ................. 364/724.19 |
| 5,164,962 | 11/1992 | Nakai et al. ............. 375/221 |
| 5,307,379 | 4/1994 | Bergstrom ............... 375/317 |
| 5,568,519 | 10/1996 | Baier et al. ............. 375/346 |
| 5,651,025 | 7/1997 | May ..................... 375/239 |

FOREIGN PATENT DOCUMENTS

| | | |
|---|---|---|
| 0 030 874 | 6/1981 | European Pat. Off. . |
| 58-36053 | 3/1983 | Japan .................... 375/221 |
| 801268 | 1/1981 | U.S.S.R. . |
| 2 101 856 | 1/1983 | United Kingdom . |
| 2 140 235 | 11/1984 | United Kingdom . |
| WO 87/04578 | 1/1987 | WIPO . |
| WO 92/06540 | 4/1992 | WIPO . |

Primary Examiner—Don N. Vo
Attorney, Agent, or Firm—Darby & Darby

[57] ABSTRACT

A method and device for detecting on an electric fence system a communication signal from a total signal including noise and also electrical interference from electrical energizer pulses supplied to the fence. A signal detector detects, directly or indirectly, the level of noise or electrical interference in the total signal on the system, at least one of a filter associated with the signal detector and the amplitude of the total signal received is adjusted until the threshold of the filter blocks sufficient electric noise so that a sufficient part of the total signal received after filtering is the communication signal, and the adjustment of the filter threshold is not dependent on the communication signal alone. The validity of the communication signal is checked and the electrical energizer pulses are transmitted on the fence system in coordination with reception of the communication signals to reduce the interference.

11 Claims, 7 Drawing Sheets

METHOD OF ELECTRONIC CONTROL

TECHNICAL FIELD

This invention relates to a method of electronic control.

BACKGROUND ART

Reference throughout this specification shall be made to use of the present invention with respect to electric fence systems, however it should be appreciated that the principles of the present invention can be applied to other systems as well.

Electric fence systems, whether powered by electric fence energisers for stock control or forming part of security systems have a number of unique features and associated problems.

Electric fence systems are becoming more and more sophisticated and in recent times there has been a number of developments in which electric fence lines are used to carry communication signals. These signals are generally used for turning electric fence energisers on or off and/or checking the status of various sectors of the electric fence system. Some of these developments are described in New Zealand Patent Application Nos. 245206 and 239506.

Unfortunately, there are a number of problems associated with electric fence energisers which makes communications along the electric fence line difficult to achieve successfully.

One major problem associated with electric fence systems is that they comprise of literally kilometres of wire. The fence wires tend to act like a high gain aerial and readily pick up any electrical signals or noise in the region. This noise can include radio waves, pulses from electric fence energisers on neighbouring farms, static electricity build-up from the atmosphere, magnetic fields from nearby mains transformers, radio frequency interference from vehicles and other sources. All this electrical noise can mean that communication signals sent along the fence line are either not detected by the appropriate receivers (as the communications signal is masked by the noise), or that the receivers interpret incorrectly the noise as being a communication signal. Either way, the presence of electrical noise along the fence line can lead to incorrect operation of the electric fence system.

A preferred communications method described in the previous patent applications is that of pulse position modulation (PPM). Pulse position modulation unlike other types of communication signals, such as those which use amplitude modulation does not suffer from attenuation as the signal propagates along the electric fence line. Attenuation does not affect pulse position modulation because as the signal goes down the line, the time between each pulse does not change, even though the amplitude of the pulse may diminish. Unfortunately some of the noise present on an electric fence line is high frequency noise. This increases the possibility of signals being picked out from the noise which correspond to the time difference expected in a communications signal under a pulse position modulated system.

A further problem associated with electric fence systems is that the amount of noise on an electric fence line is not constant and varies from electric fence system to electric fence system and can also vary for a single electric fence system over a period of time. This variation can occur as a result of many factors such as the load on the electric fence line which can change depending on whether there are dry or wet conditions, whether there is grass or other objects touching the electric fence line and whether there are poor connections in the electrical fence system such as those resulting from improperly connected fence wires. Other factors contributing to the varying electrical noise include the possible presence of electrical noise sources such as radio stations, transmission wires, neighbouring farms, heavy electrical machinery such as pumps and the like.

Because of this varying electrical noise and the associated unpredictability, it is very difficult to design a communications system for an electric fence line that can, no matter what the conditions, guarantee to filter out the appropriate amount of electrical noise while still allowing a sufficiently strong communications signal to be received by receivers in the electric fence system.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention, there is provided a method of detecting on a system a communication signal from a total signal, the method being characterised by the steps of:

(a) detecting directly or indirectly the level of noise or electrical interference in the total signal on the system with a signal detector, and (b) adjusting a filter associated with the signal detector or adjusting the total signal received until the threshold of the filter blocks sufficient electrical noise so that a sufficient part of the total signal received by the signal detector after filtering is the communication signal.

Reference throughout this specification shall now be made to the system on which the communication signals are propagated as being an electric fence system, however it should be appreciated that the present invention can apply to other situations.

The "sufficient part" of the communications signal received shall mean enough of the communication signal for it to be intelligible or useable for the task for which the communication signal was generated.

The detection of noise may be either direct or indirect. If direct, the actual noise may be measured. If indirect, the communication signal may be measured above the noise level effectively giving an indication as to the noise level.

The term total signal shall now be defined as being the combination of the communication signal and any noise or electrical interference.

It can be seen that having a system by which there is a filter or total signal which is adjusted in accordance with the electrical noise or interference being detected, a number of the problems associated with the prior art have been overcome. With the present invention, it is now possible for an electric fence system to be installed with the knowledge that irrespective of the local noise environment, that the receiver will still be able to detect a communication signal propagated along the electric fence system.

In some embodiments, there may be provided a system whereby not only does the filter adjust to block out the appropriate noise level, but also the level of the communication signal may be boosted if required so that the receiver still receives a clear powerful communication signal although a heavy filter has been applied.

The present invention can be operated by a variety of means.

In some embodiments of the present invention the filter is adjusted manually.

In one embodiment, the electric fence system may be quiet, that is no electric fence energiser pulses and communication signals being transmitted along same. When the fence is quiet, a signal detector (possibly, but not necessarily associated with the receiver) detects the level of noise on the electric fence line. A filter can then be adjusted by some processing means until no or minimal noise passes through the filter to the signal detector. If a comparator is used as the filter, then the reference associated with the comparator can be adjusted via the D/A or pulse width modulated (PWM) output from a microcontroller or some other processing means.

In one embodiment of the present invention it may be assumed that there is a communication signal and the filter may be adjusted up or down until a recognisable communication signal is detected.

In other embodiments the filter threshold may be set at an initial level and periodically taken down (or up) and reset according to the noise level detected directly or indirectly.

In some embodiments of the present invention there may be provided a method which includes the steps of:

a) sending a reference waveform along the system, and b) comparing the reference waveform with the stored reference waveform, and c) setting the filter level in accordance with the difference between the two waveforms.

Alternately, there may be provided method which includes the step of measuring both the noise and communication signal and filtering out the noise signal using a software filtering technique.

The filter may be of any type and as an example may be one of (or a combination of) the following; RC filter, LC filter, comparator, passive or active resistive divider, capacitive divider.

One means by which the threshold level of the filter can be adjusted is to use a bit increment at a time to adjust the reference. For example, the reference may be adjustable over a predetermined range which can be divided into $2^8$ or 256 equal increments. Thus it can be seen that increasing the reference by using a single bit or increment can provide very fine control over the threshold level of the filter. Alternatively, a searching algorithm may be employed.

In some embodiments of the present invention there may be provided an additional safety margin which sets the threshold of the filter at a predetermined level above the electrical noise. An alternative embodiment could be to set and/or maintain a threshold of the filter or alternatively at a predetermined signal/noise ratio.

It should be appreciated that it is desirable to have the lowest detection level above the noise level so as to be able to communicate over the greatest possible distance with the highest possible reliability for a particular fence system.

Preferably the filter is set at a level so that no electrical noise passes through to the receiver. Unfortunately, it is common for high voltage pulses to be induced along fence lines from neighbouring electric fence energisers. These pulses may have a magnitude considerably higher than the average electrical noise and possibly in the region of the communication signal. Thus, it is possible in an unintelligent system for the threshold of the filter to be set above the induced pulses and the communication signal as well. Therefore, in preferred embodiments there is provided means by which these induced high voltage pulses are not taken into account when the threshold of the filter is being set. Thus, these large pulses may still pass through the filter. This is not too much of a concern however as electric fence energiser pulses typically occur once every second, whereas communication pulses can occur for example every 10 ms to 100 ms apart, or in that magnitude. Thus, there may be provided validity checking of the communication signal, so the induced high voltage pulses will not have an effect on the system.

The present invention may be co-ordinating intelligently with the energiser pulses generated on the electric fence system itself. For example, the communication signals may be sent and received between energiser pulses.

If, as expected in preferred embodiments, there is no intelligent co-ordination, then validity checking may be applied as for induced pulses.

The threshold can be adjusted over any desired period of time. For example, the filter threshold can be continually updated. While this is suitable for fence systems using the electric fence energisers, this is not as suitable for security systems which must react quickly to rapid changes in the state such as an increased load on the fence due to a break in. Thus, it is preferred the threshold is updated so as to take into account only gradual changes in the noise on the fence system rather than rapid ones. For example, the adjustment may be by way of a rolling average, or some other averaging method.

In other embodiments of the present invention the adjustment of the threshold level may be manually achievable, perhaps by using a tuned capacitor or potentiometer or some other means of adjustment.

Although reference throughout the specification has been made to the medium being monitored as an electric fence, it should be appreciated that other mediums may be used such as power lines, twisted pair and so forth. In some embodiments in the present invention, a device operating in accordance with the present invention may adjust the medium to improve communications, for example adjust the medium termination to minimise interference, or dynamically re-route the signal.

The device may also instruct a transmitter to re-transmit the total signal at a boosted level. Alternatively the device may cause the signal to be re-transmitted by a relay station. For example the relay station may be close and more able to achieve a greater signal to noise ratio at the receiver than the original device.

In some embodiments, the receiver may act to ignore the total signal received if it contains too high a noise level.

In some embodiments the total signal gain may be adjusted rather than or in combination with the threshold level. For example, the total signal may be attenuated to bring both the communication signal and noise level down. Preferably, this attenuation brings the noise below the filter threshold level, but keeps the communication signal above the filter threshold level. There may be some adjustment of the filter level as well.

In some embodiments, the filter threshold level in the device may be altered according to how other devices on the medium are operating. For example, if the electric fence energiser output voltage is low, then the interference may be low and thus the filter threshold level could be accordingly set low.

A device that operates in accordance with the present invention may come in many forms. For example, the device may be an energiser, a hand held device, a monitor, sensor, actuator, electric fence transceiver or another device.

It should now be appreciated that the present invention enables communication signals to be received more clearly on systems in a variety of situations including fence and security systems.

BRIEF DESCRIPTION OF DRAWINGS

Aspects of the present invention will now be described by way of example only and with reference to the accompanying drawings in which.

BEST MODES FOR CARRYING OUT THE INVENTION

Figure 1:
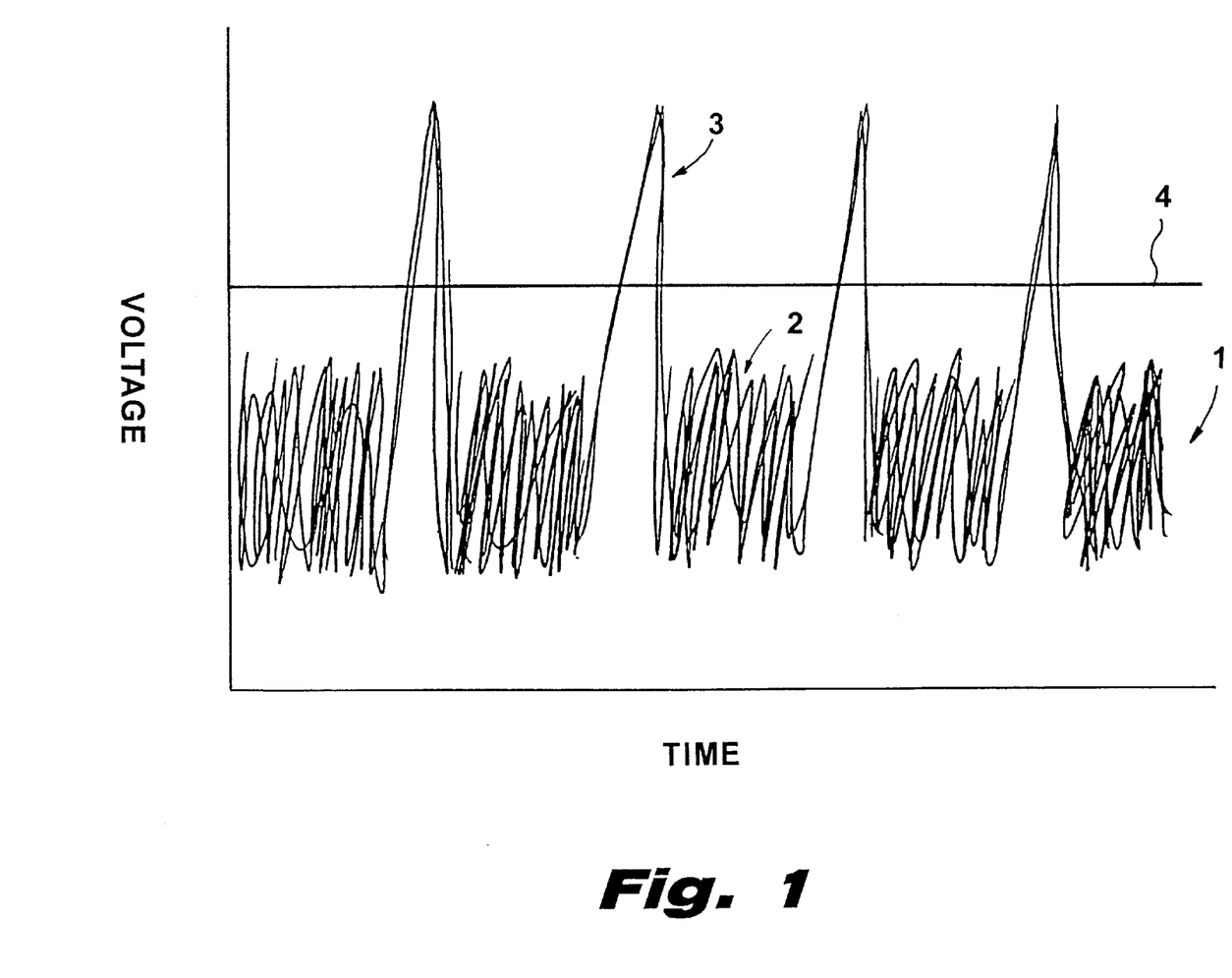
FIG. 1 is a graph of a possible signal on an electric fence line.

With respect to FIG. 1, there is illustrated a voltage versus time graph of a possible signal on an electric fence line.

The signal generally indicated by arrow 1 is comprised of two components, namely high frequency noise 2 and communication signal pulses 3.

The communication signal pulses 3 have a higher voltage than the noise 2. Thus, if a filter having a threshold value 4 is applied, then only the signal pulses 3 will pass through the filter and into the signal receiver.

Figure 2:
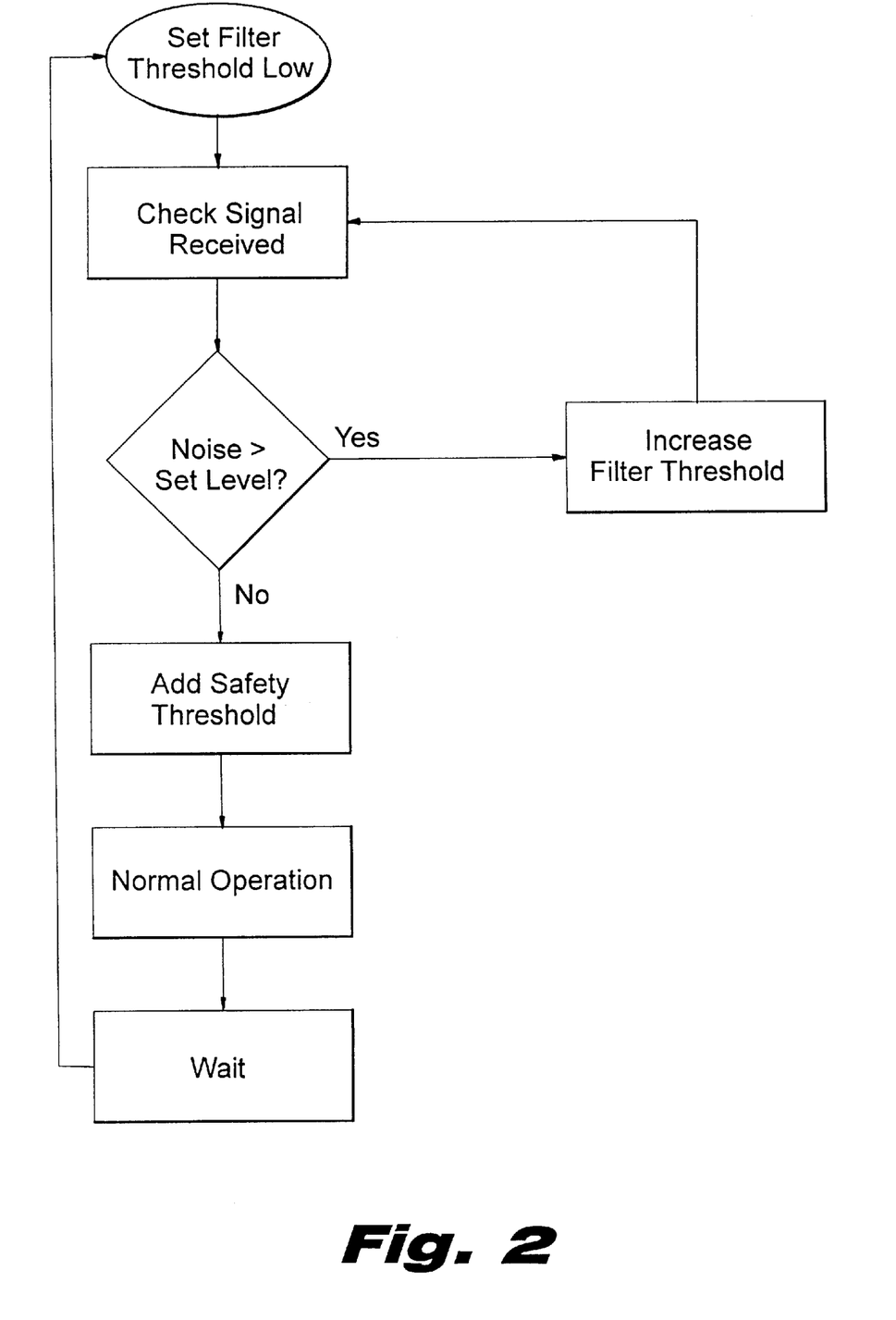
FIG. 2 is an algorithm of one possible method in accordance with the present invention.

FIG. 2 illustrates a possible algorithm by which one embodiment of the present invention can operate.

Initially the filter threshold is set low. Then the amount of noise passing through the filter is checked. If there is noise above a set level, then the filter threshold is increased and the signal checked until no noise passes through the filter. Once this has been achieved, a safety threshold is added to account for higher than average noise levels occurring. Then, the communication system can operate as normal. After some period of time the process is repeated.

Figure 3:
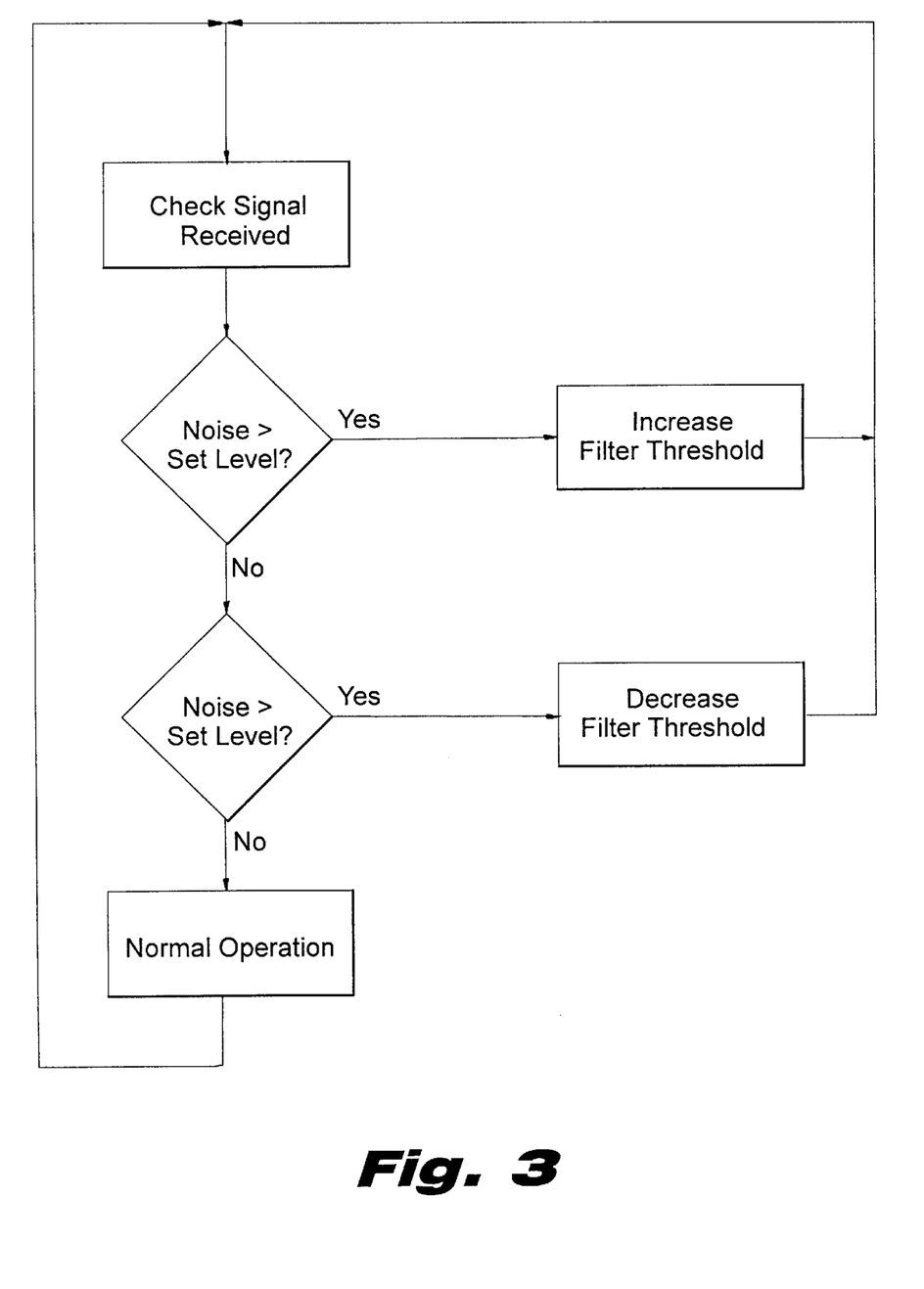
FIG. 3 is an alternate algorithm for use with the present invention, and FIGS. 4, 5, 6 and 7 each illustrate various embodiments and componentry of the present invention.

FIG. 3 illustrates an alternate and preferred algorithm for use with the present invention. Initially, a check on the total signal is received. If the noise received is greater than a set level then the filter threshold is increased and a further check is made to see if the signal is received again. If the noise is not above the set level, then the total signal is checked to see whether the noise is below a set level. If the noise is below the set level then the filter threshold is decreased and the signal checked again. This checking and altering of the filter threshold continues until the noise received is at the set level after which the device moves into normal operation. After some period of time the process is repeated.

Figure 4:
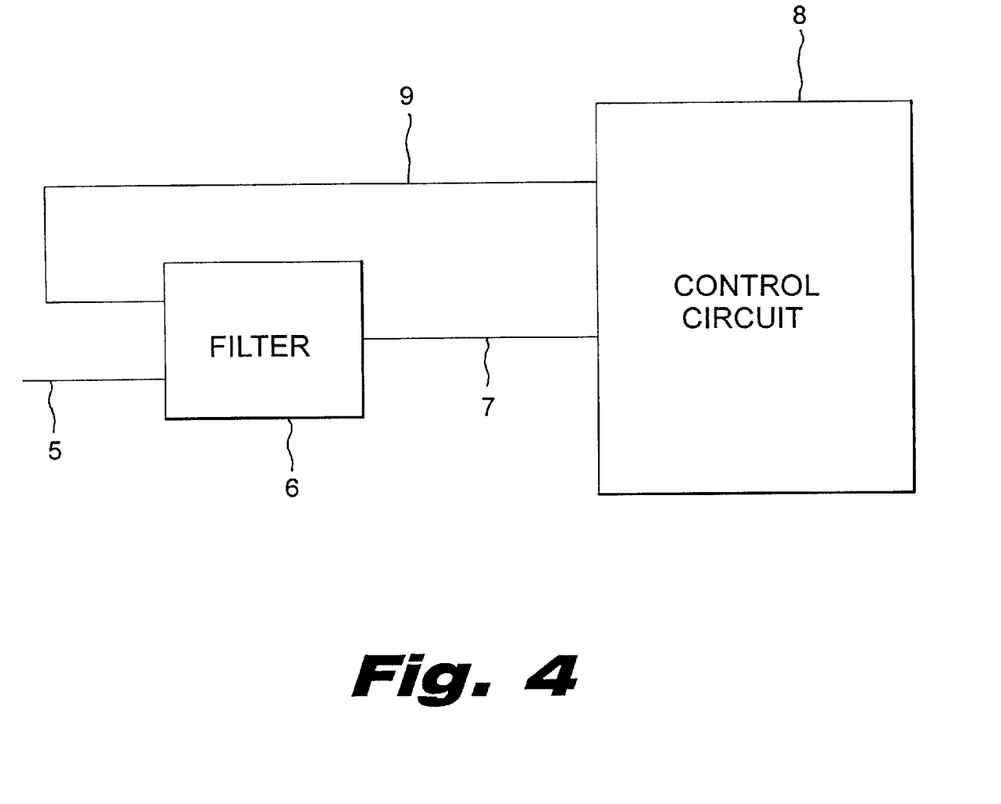

FIG. 4 illustrates a configuration of the device which may be operated in accordance with the present invention.

An input line 5, which can carry the total signal, that is both the noise and communication signal is connected to an electrical filter 6. The output line 7 from the filter 6 is connected to a control circuit 8. The output line 7 carries only the filtered total signal, a sufficient part of which is communication signal.

The feedback line 9 carries feedback from the control circuit 8 to the filter 6.

One means by which the device in FIG. 4 can operate is as follows.

Firstly, the feedback line 9 may be set low. The filter 6 may then pass all interference from the input line 5 on to the output line 7. The control circuit 8 can then sense this interference and move the feedback level on the line 9 up slightly and then re-check the output line 7. This action can continue until the feedback levels is sufficient so that only the communication signal passes through the filter 6. An additional safety could be added to the feedback level.

Figure 5:
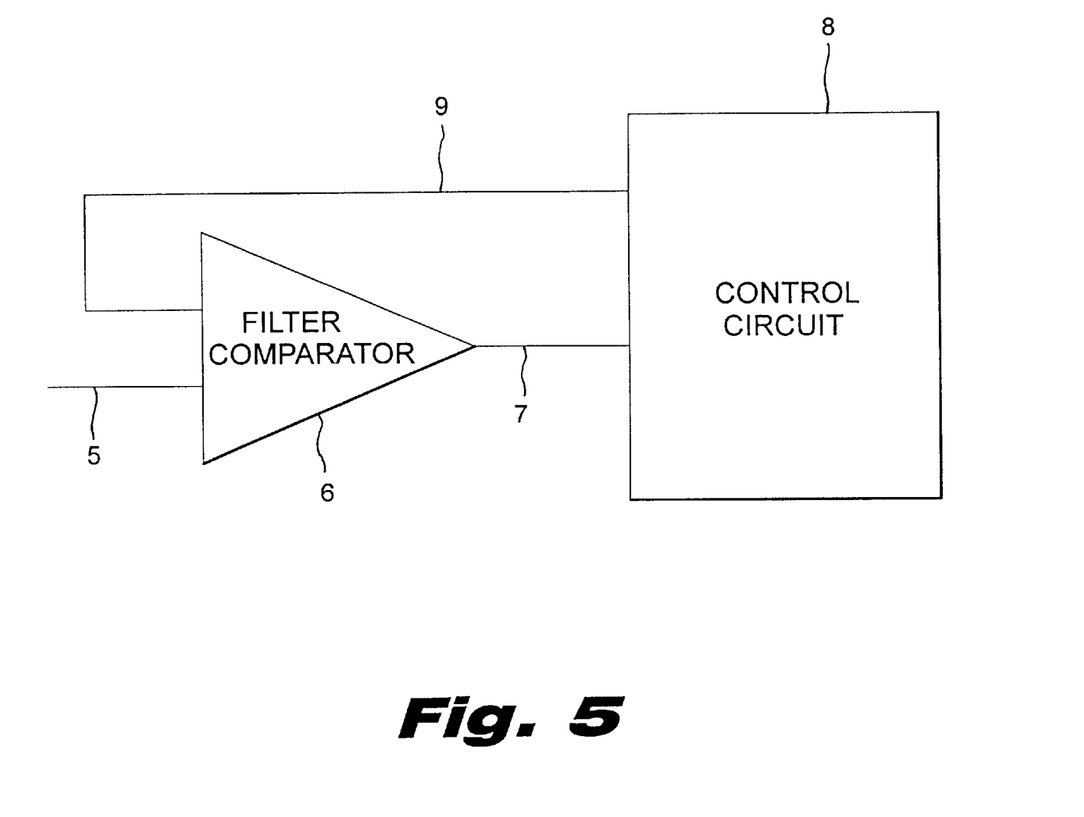

FIG. 5 illustrates a comparator detection circuit which can implement the operation described above.

Input line 5 carries both the interference and communication signals and connects to a filter 6 which is in the form of a comparator. The output line 7 is connected between the comparator 6 and a control circuit 8. A feedback line 9 connects the control circuit 8 to the comparator 6.

The operation of the circuitry is similar to that described above. In some embodiments, the control circuit 8 may be a micro processor which adjusts the feedback level 9 using a digital to analogue converter.

Figure 6:
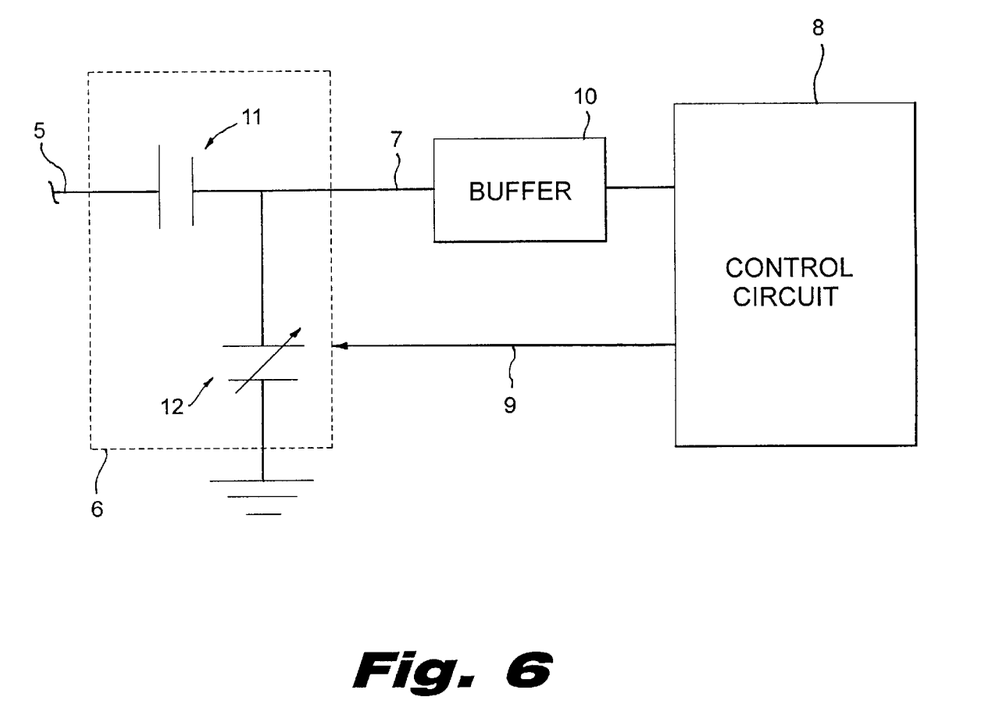

FIG. 6 illustrates a capacitive divider adjustment which can be used with the present invention.

Again, an input line 5 carrying a communication and an interference signal is connected to a filter 6. In this embodiment the filter 6 is a capacitive divider filter having a fixed capacitor 11 and a variable capacitor 12, the variable capacitor 12 being connected to the ground.

The output line 7 from the filter 6 passes through a buffer 10 before entering the control circuit 8. The feedback line 9 is connected to the variable capacitor 12.

In operation, the feedback line 9 may be set low. The filter 6 passes the total signal from the input line 5 on to the output line 7. This is passed through the buffer 10 and into the control circuit 8. Control circuit 8 can sense the interference and move the feedback level 9 up slightly. This causes the capacitive divider filter 6 to pass slightly less of the total signal through to the output line 7.

Figure 7:
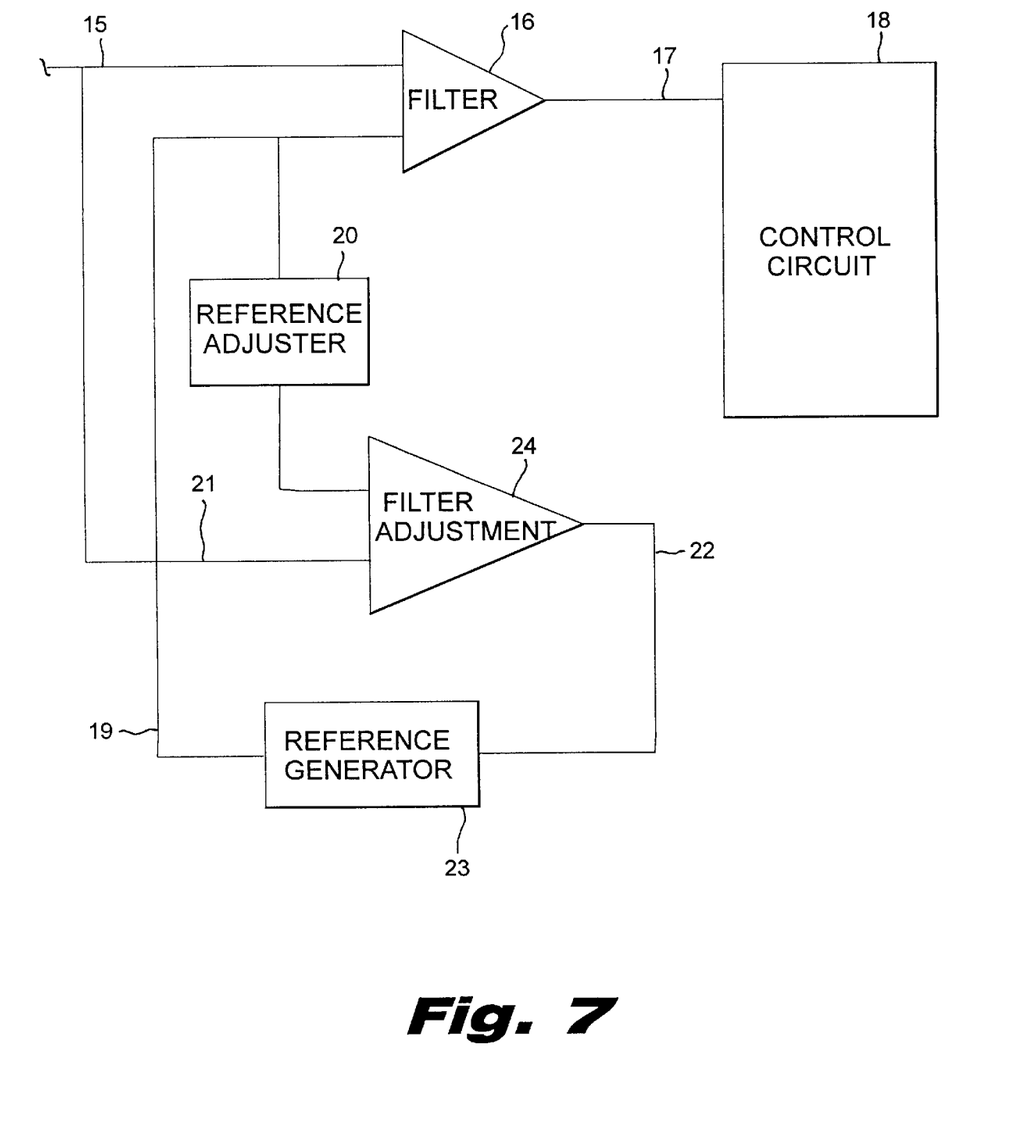

FIG. 7 illustrates a feed forward circuit that can implement one embodiment of the present invention.

The input line 15 is connected to the filter 16 and the filter adjustment circuit 24. The input line 15 carries the total signal, that is both the interference and the communication signal.

The reference line 19 connects the reference generator 23 to the filter 16 and a reference adjuster 20.

The reference line 21 for the filter adjustment circuit 24 is connected from the reference adjuster 20.

The output line 22 from the filter adjustment circuit 24 connects to the reference generator 23. The output line 17 connects the filter 16 to the control circuit 18 which may or may not be a microcontroller.

In operation, the filter adjustment circuit 24 continually measures the input line 15 and compares it to a reference point. The output of the filter adjustment circuit 24 is used to generate a reference for the filter 16. This reference is also fed into the reference adjustor 20 that subtracts a certain amount from the reference 19 for use in the filter adjustment circuit 24. The output 17 from the filter 16 is then fed into the control circuit 18.

Aspects of the present invention have been described by way of example only and it should be appreciated that modifications and additions may be made thereto without departing from the scope thereof as defined in the appended claims.

I claim:

1. A method of detecting on an electric fence system a communication signal from a total signal including noise and electrical interference from electrical energizer pulses supplied to the fence, comprising:

detecting directly or indirectly by a signal detector the level of noise or electrical interference in the total signal on the system, adjusting a filter associated with said signal detector to adjust the total signal received until the threshold of the filter blocks sufficient electric noise so that a sufficient part of the total signal received after filtering is a communications signal, whereby adjustment of the filter threshold is not dependent on the communication signal alone, validity checking the communication signal; and transmitting the electrical energizer pulses on the fence system in coordination with reception of the communication signals to reduce interference.

2. A method as claimed in claim 1 wherein the filter is adjusted until no or minimal noise passes through the filter to said signal detector.

3. A method as claimed in claim 1, which further comprises adjusting the filter level either up or down until a recognizable communication signal is detected.

4. A method claimed in claim 1, wherein the filter threshold is reset on a periodic basis.

5. A method as claimed in claim 1, which further comprises:

sending a reference waveform along the system;

comparing the reference waveform with a stored reference waveform; and setting the filter level in accordance with the difference between the two waveforms.

6. A method as claimed in claim 1, which further includes the step of measuring both the noise communication signal and filtering out the noise signal using a software filtering technique.

7. A method as claimed in claim 1, which further comprises maintaining a predetermined signal/noise ratio.

8. A method as claimed in claim 1, wherein adjustment of the filter level takes into account gradual changes in the noise on the system.

9. A method as claimed in claim 1, further comprising instructing a transmitter which sends the communication signal to retransmit the communication signal at a boosted level.

10. A method as claimed in claim 1, further attenuating the total signal to bring the noise level below a filter threshold.

11. Apparatus for detecting on an electric fence system a communication signal from a total signal including noise and electrical interference from electrical energizer pulses supplied to the fence, comprising:

a signal detector for detecting directly or indirectly the level of noise or electrical interference in the total signal on the system, means for adjusting of a filter associated with said signal detector to adjust the amplitude of the total signal received until the threshold of the filter blocks sufficient electric noise so that a sufficient part of the total signal received after filtering is a communications signal, whereby adjustment of the filter threshold is not dependent on the communication signal alone, means for validity checking the communication signal, and means for transmitting the electrical energizer pulses on the fence system in coordination with reception of the communication signals to reduce interference.

* * * * *